United States Patent [19]

Barois et al.

[11] Patent Number: 4,997,620

[45] Date of Patent: Mar. 5, 1991

[54] PROCESS AND DEVICE FOR LIMITING THE INTENSITY OF PARASITIC JETS OF COOLING WATER IN A PRESSURIZED-WATER NUCLEAR REACTOR

[75] Inventors: Guy Barois, Asnieres; Gérard Chevereau, Le Raincy, both of France

[73] Assignee: Framatome, Courbevoie, France

[21] Appl. No.: 318,879

[22] Filed: Mar. 6, 1989

[30] Foreign Application Priority Data

Mar. 4, 1988 [FR] France ................. 88 02779
Nov. 18, 1988 [FR] France ................. 88 15027

[51] Int. Cl.⁵ ............................................. G21C 15/02
[52] U.S. Cl. ..................................... 376/400; 376/260
[58] Field of Search ............... 376/400, 399, 377, 389, 376/352, 302, 303, 292, 459, 260

[56] References Cited

U.S. PATENT DOCUMENTS

| | | | |
|---|---|---|---|
| 4,080,257 | 3/1978 | Machado et al. | 376/400 |
| 4,462,956 | 7/1984 | Boiron et al. | 376/400 |
| 4,649,609 | 3/1987 | Allison et al. | 376/400 |
| 4,675,152 | 6/1987 | Verdeau et al. | 376/400 |
| 4,786,465 | 11/1988 | Ales | 376/400 |

FOREIGN PATENT DOCUMENTS

| | | |
|---|---|---|
| 0039288 | 11/1981 | European Pat. Off. . |
| 0060777 | 9/1982 | European Pat. Off. . |
| 1305489 | 8/1962 | France . |
| 2063945 | 7/1971 | France . |
| 2333326 | 6/1977 | France . |
| 2561963 | 10/1985 | France . |

OTHER PUBLICATIONS

"Curing Baffle Jetting at Tihange 1 with an Upflow Conversion", Le Dantec, NEI, 11/87.

Primary Examiner—Daniel D. Wasil
Attorney, Agent, or Firm—Pollock, Vande Sande & Priddy

[57] ABSTRACT

During a shutdown of the reactor, a device for partially closing off (27) the openings (26) of the reinforcements (6) located below the upper reinforcement (6a) is introduced through the opening (25) of the upper reinforcement (6a) of the partitioning of the core of the reactor. The closing off devices (27) remaining in position in the partitioning of the reactor after restarting thereof permit the increase and regulation of the head loss of the cooling water circulating in the annular space (7) around the partitioning (5) of the core. The closing-off device may consist of a rod (27) engaged in a set of openings (26) of the reinforcements (6) aligned along a vertical direction.

2 Claims, 11 Drawing Sheets

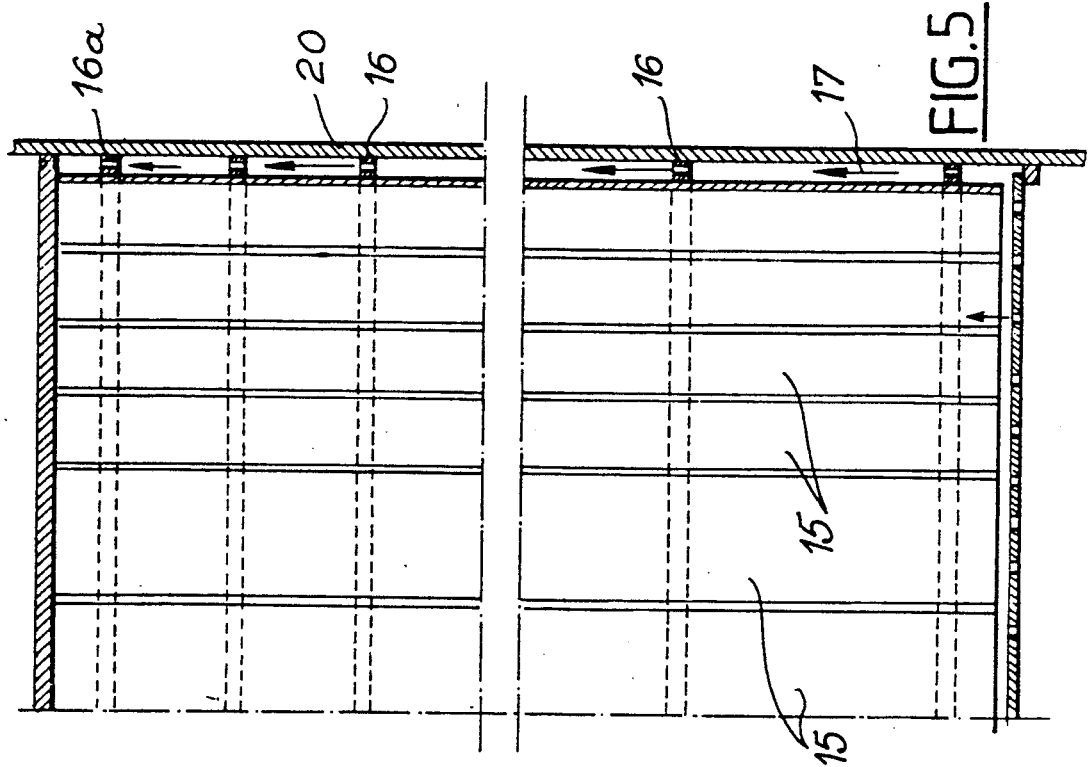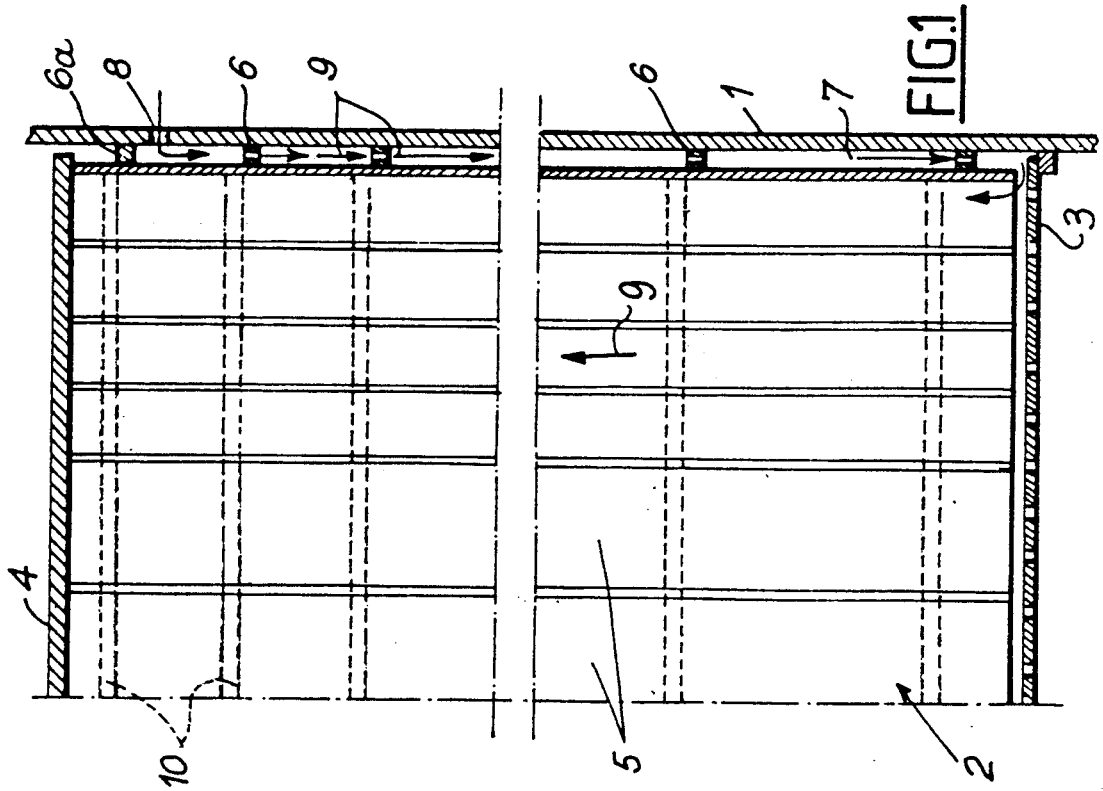

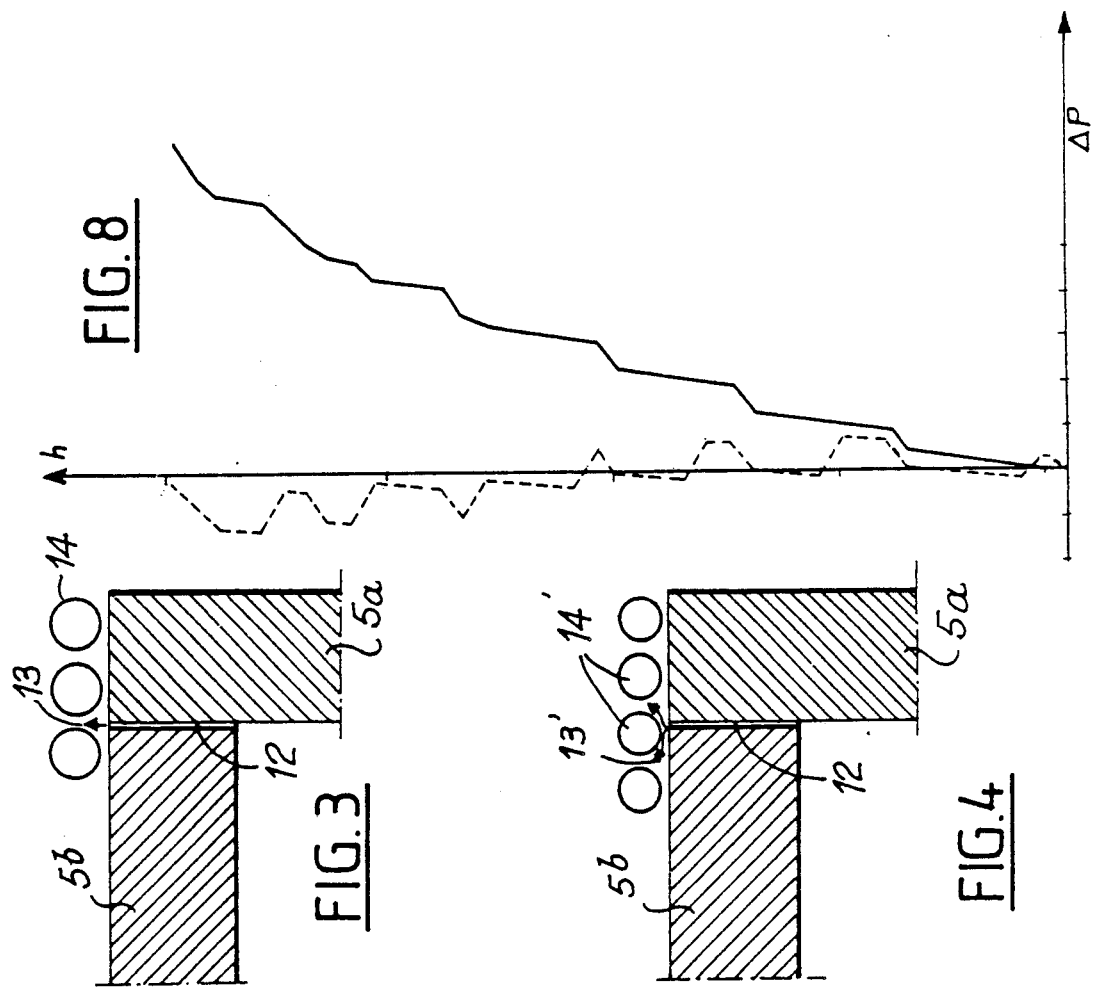
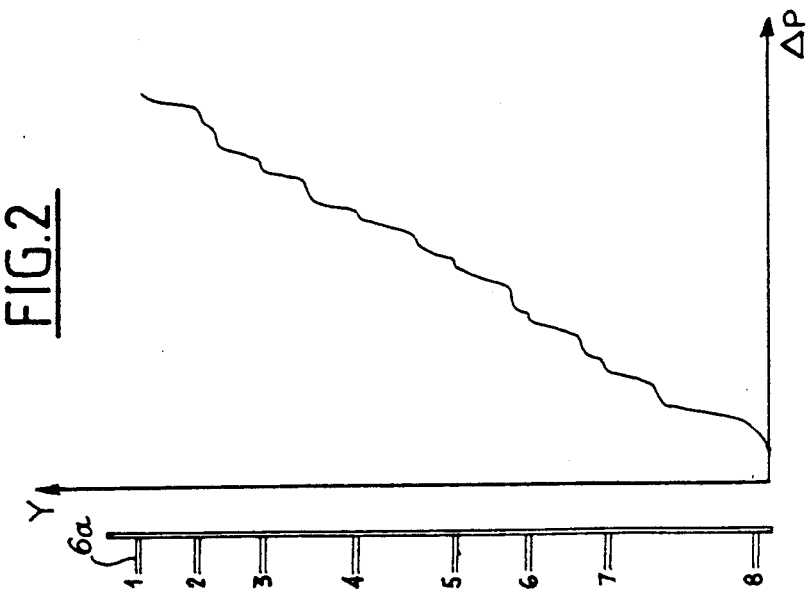

FIG. 6
FIG. 7
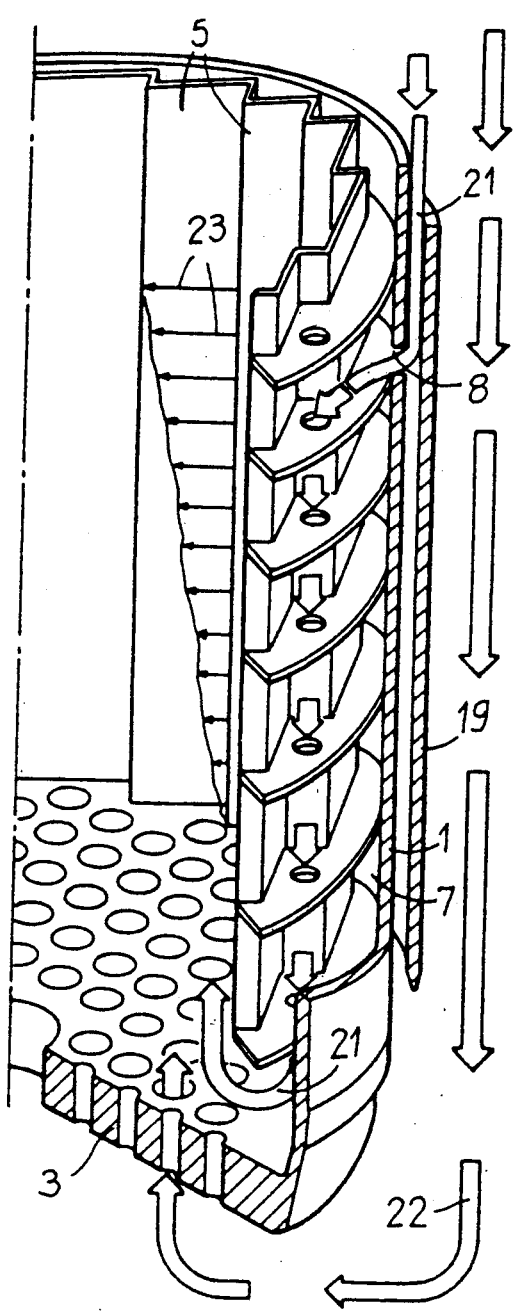
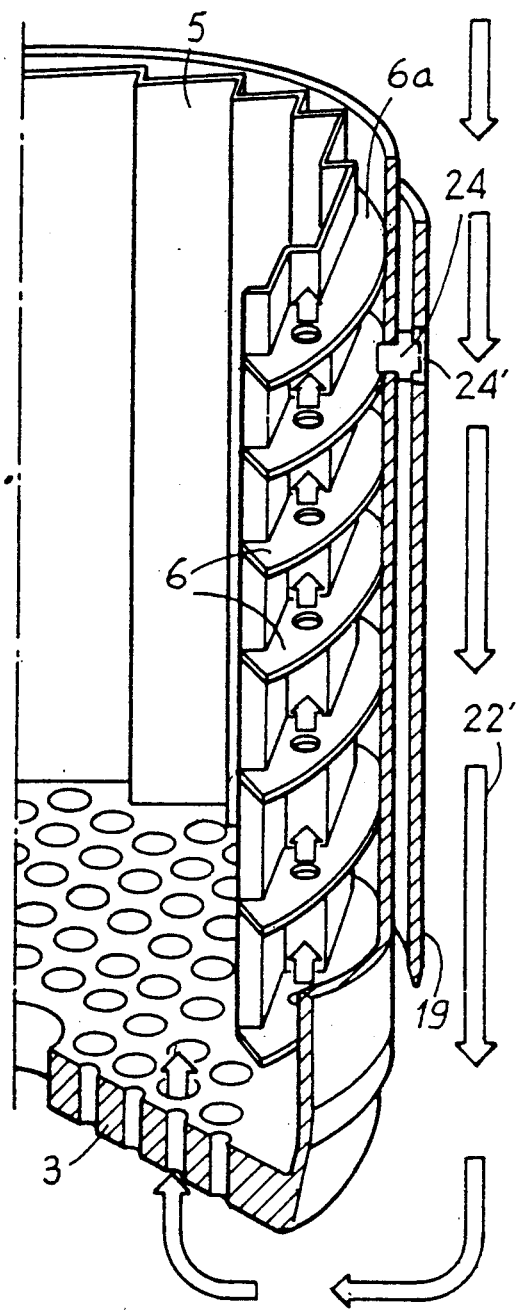

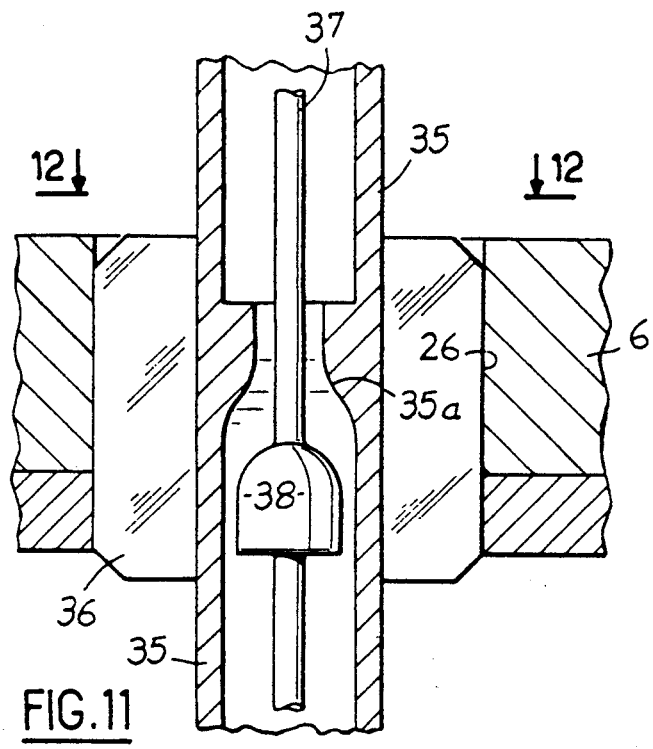
FIG. 11
FIG. 12
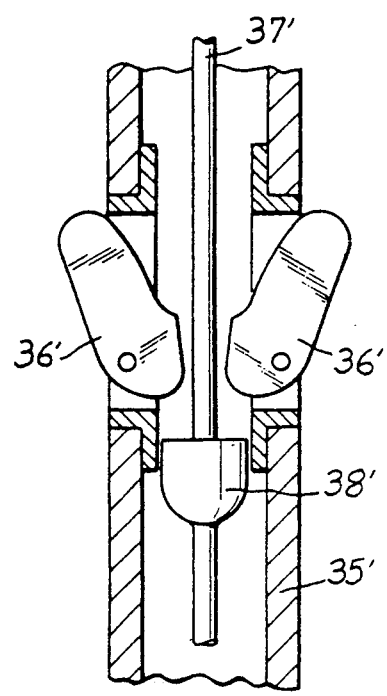
FIG. 13

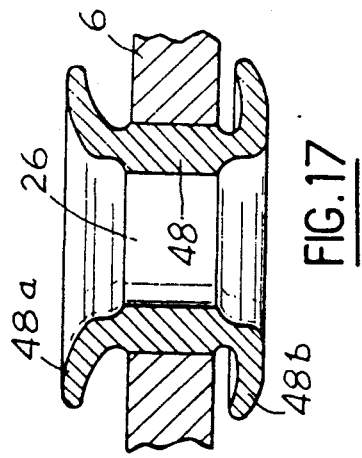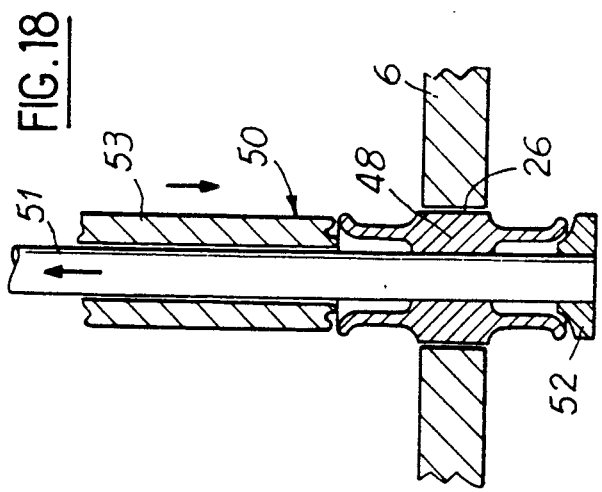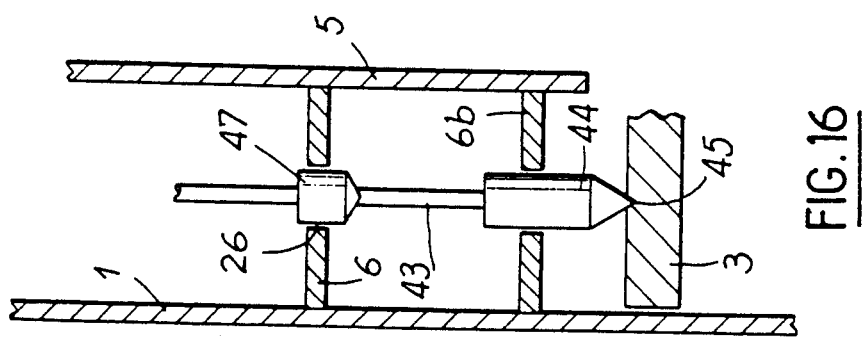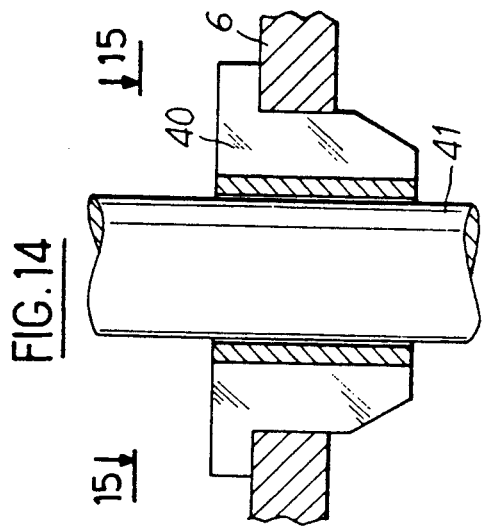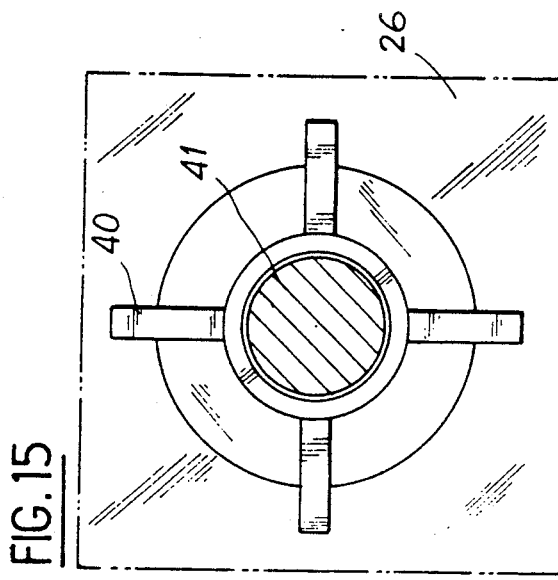

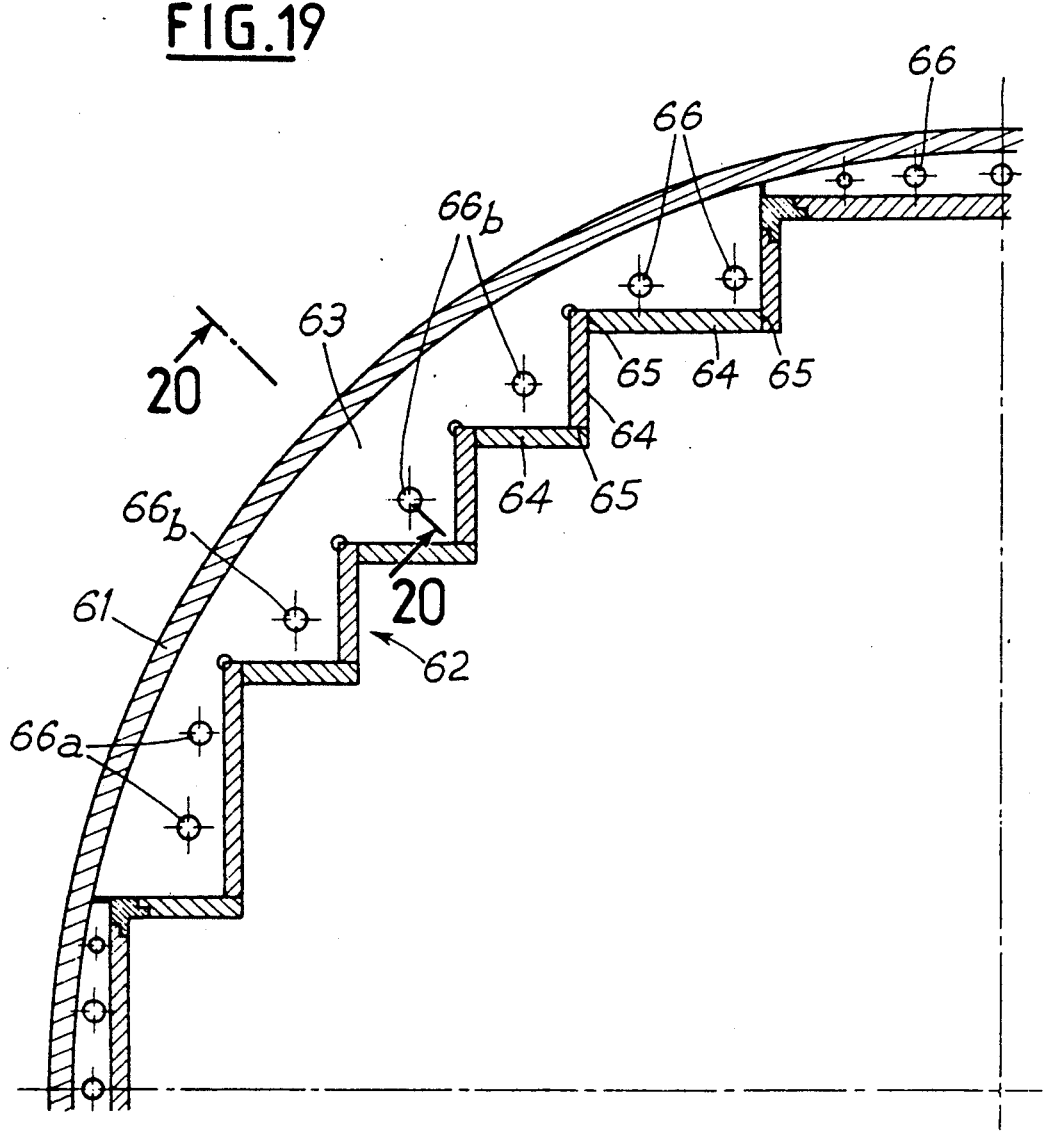

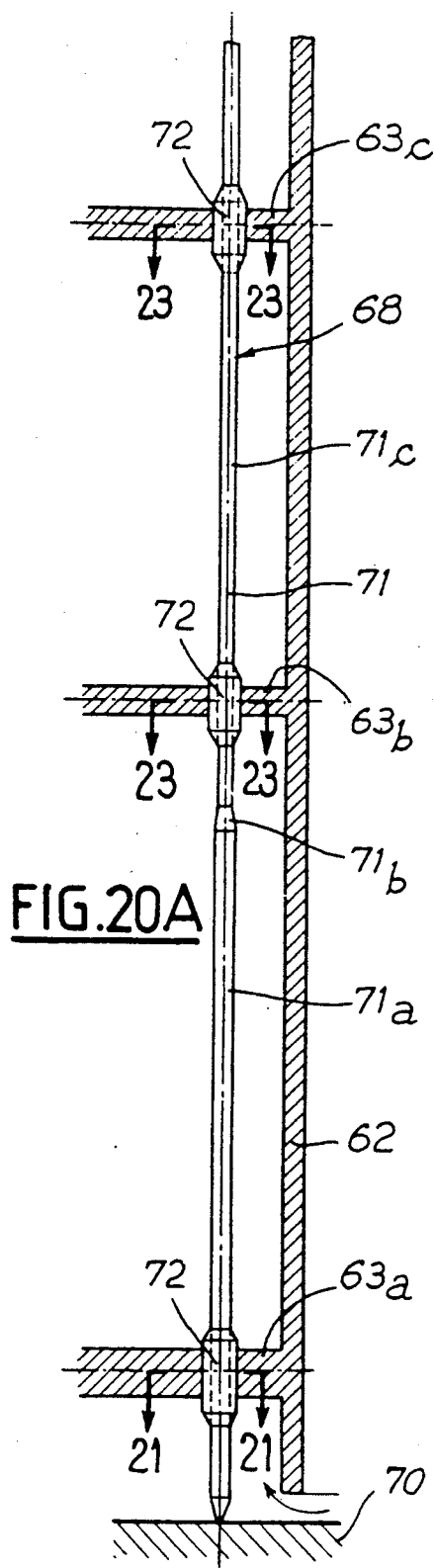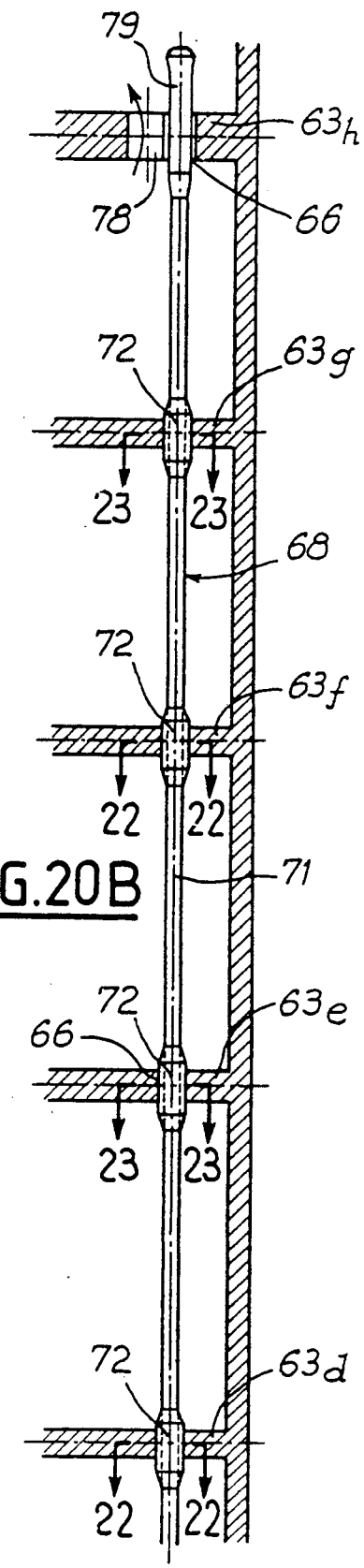

PROCESS AND DEVICE FOR LIMITING THE INTENSITY OF PARASITIC JETS OF COOLING WATER IN A PRESSURIZED-WATER NUCLEAR REACTOR

FIELD OF THE INVENTION

The invention relates to a process and apparatus for limiting the intensity of parasitic jets of cooling water in a pressurized-water nuclear reactor in service.

BACKGROUND OF THE INVENTION

Pressurized water nuclear reactors generally include a core consisting of fuel assemblies of prismatic form which are disposed vertically and juxtaposed. The core is placed within the vessel of the nuclear reactor, in which vessel water for cooling the reactor circulates. The core is surrounded by a partitioning which closely follows the form of its peripheral surface and ensures retention thereof within a core envelope of cylindrical form with a vertical axis. The partitioning comprises vertical plates placed at right angles to one another and reproducing the external form of the core, as well as reinforcements consisting of horizontal plates disposed at regular intervals according to the height of the core, within an annular space provided between the periphery of the core and the internal surface of the core envelope.

In the pressurized-water nuclear reactors of the most current type which were constructed up to the beginning of the 1970's, cooling water penetrates into the core envelope through one or more orifices provided in its upper part and circulates from top to bottom within the annular space surrounding the core, the horizontal reinforcement plates of the partitioning being pierced, with the exclusion of the plate situated uppermost and disposed above the orifice of the core envelope, which constitutes the upper reinforcement. The cooling water circulates within the core in the vertical direction and from bottom to top. On either side of the partitioning, the cooling water therefore circulates in opposite directions. On the other hand, this cooling water in circulation suffers losses of head, in particular within the assemblies of the core, at the location of the bracing plates ensuring the retention of the fuel rods. A pressure difference therefore exists on either side of the vertical plates of the partitioning, which pressure difference is neutralized in the lower part of the core where the current of cooling water penetrates into the core and which is at a maximum at the upper part of the core, the cooling water in circulation having then suffered the maximum loss of head.

The vertical plates of the partitioning are, on the other hand, mounted at right angles to one another, without the junction zone being closed off in a sealed manner. There is therefore, in general, an interstice between two successive partitioning plates, this interstice placing the annular space at the periphery of the partitioning in communication with the core disposed within the partitioning.

On account of the pressure difference existing between the two sides of the vertical walls of the partitioning, parasitic jets of cooling water appear when the nuclear reactor is in service. These parasitic jets of water are directed in the direction extending from the annular space around the partitioning towards the interior of the core and are liable to strike the fuel rods of the assemblies disposed in proximity to the zones of connection of the partitions. These jets give rise to vibrations of the rods, which are detrimental to their proper maintenance in service.

In nuclear reactors of more recent design, an attempt has been made to reduce or to eliminate these parasitic jets, by reducing or by neutralizing the differential pressure on either side of the partition or even by making this pressure difference negative.

In order to achieve this result, the structure and design of the core envelope and of the partitioning were slightly modified in order to obtain a circulation of the cooling water of the reactor directed from bottom to top, both in the core and in the annular space located at the periphery of the partitioning. The core envelope does not include any orifice at its upper part, and the horizontal upper reinforcement of the partitioning is pierced in order to permit the passage of the cooling water, at the upper part of the annular space. The horizontal reinforcements of the partitioning are disposed in coincidence with the bracing plates of the assemblies of the core, and these reinforcements are pierced in such a manner that the cooling water circulating within the annular space suffers a loss on passing through the reinforcements which is equivalent to the head loss suffered by the water in circulation within the core, on passing through the bracing plates of the assemblies.

In nuclear reactors of older design which have been placed in service and utilized according to the principle of the circulation of the cooling water in countercurrent on either side of the partitioning, an intervention has been provided permitting the cooling water to be caused to circulate in the same direction on either side of the partitioning of the core. This intervention consists in blocking the orifice or orifices located at the upper part of the core envelope and in piercing the upper reinforcement of the partitioning.

Such an intervention produces a certain improvement of the operation of the reactor, by a reduction of the intensity of the parasitic jets of cooling water through the partitioning. However, there are still zones, in particular in the bottom part of the core, where the pressure within the annular space at the periphery of the partitioning is greater than the pressure within the core. This is due, in particular, to the fact that the reinforcements are not generally disposed at the same level as the grids of the assemblies of the core.

In the case where the play between the partitions is relatively great, the parasitic jets of cooling water exhibit locally an intensity which exceeds generally accepted limits. In this case, it is necessary to reduce the play between the partitions, either by hammering of the joint or by screwing of the parts of the partitions which are in coincidence.

Such operations must be carried out under water during a shutdown period of the reactor and require the utilization of specially designed means.

SUMMARY OF THE INVENTION

The object of the invention is thus to propose a process for limiting the intensity of parasitic jets of cooling water in a pressurized-water nuclear reactor in service, the reactor comprising a core consisting of juxtaposed fuel assemblies and surrounded at its periphery by partitioning comprising vertical plates between which there are interstices constituting passages for the parasitic jets of water through the partitioning, towards the interior of the core, and horizontal reinforcement plates disposed at different levels between the vertical plates and a cylindrical core envelope having a vertical axis, surrounding the partitioning and forming an annular space around the vertical plates, in which space are placed the reinforcements which are pierced in such a manner that the cooling water circulates from bottom to top, both in the core and within the annular space of the partitioning, this process permitting the reduction, or even the neutralization, of the parasitic jets, whatever may be the play between the partitions and whatever may be the arrangement of the reinforcements of the partitioning, in an existing nuclear reactor.

In order to achieve this object, there are introduced and placed in position, during a shutdown of the reactor, through the openings of the uppermost reinforcement, devices for partially closing off at least a part of the openings of the reinforcements located below the upper reinforcement, the closing-off devices remaining in place after the restarting of the reactor, in order to increase and to regulate the head losses of the cooling water circulating within the annular space.

The invention is also concerned with devices for partially closing off the openings of the reinforcements of the partitioning, to ensure that the intensity of the parasitic jets of cooling water is limited.

BRIEF DESCRIPTION OF THE DRAWINGS

In order to provide a good understanding of the invention, a description will now be given, by way of example, with reference to the accompanying drawings, of several embodiments of the process according to the invention, in comparison with prior art processes which are used to reduce the parasitic jets in a pressurized-water nuclear reactor.

FIG. 1 is a half-view in cross-section through a vertical plane of the partitioning of the core of a nuclear reactor according to design involving a counter-current circulation of the cooling water on either side of the partitioning.

FIG. 2 is a curve representing the variation of the pressure difference on either side of the partitioning represented in FIG. 1, according to the height of the core.

FIGS. 3 and 4 are views on a large scale, in cross-section through a horizontal plane, of two junction zones between vertical plates of a partitioning, in the case of a reactor core consisting of assemblies of a first type and of a second type.

FIG. 5 is a half-view in cross-section through a vertical plane of a partitioning of a core of a pressurized-water nuclear reactor of a design involving a circulation of the cooling water in the same direction, on either side of the partitioning.

FIGS. 6 and 7 are views, in exploded perspective, of the partitioning of a pressurized-water nuclear reactor, before and after a conversion operation permitting modification of the operation of the reactor, as regards the direction of circulation of the cooling water.

FIG. 8 represents the curves of variation of the pressure difference on either side of the partitioning, before and after the conversion represented in FIGS. 6 and 7, respectively.

FIG. 11 is a view, in vertical cross-section, of a second embodiment of a device for partial closing-off according to the invention.

FIG. 12 is a view along line 12—12 in FIG. 11.

FIG. 13 is a view, in vertical cross-section, of a third embodiment of a device for partial closing-off according to the invention.

FIG. 14 is a view, in vertical cross-section, of a fourth embodiment of a device for partial closing-off according to the invention.

FIG. 15 is a view along line 15—15 in FIG. 14.

FIG. 16 is a view, in vertical cross-section, of a modification of the supporting means of a device for closing-off as represented in FIG. 9.

FIG. 17 is a view, in vertical cross-section, of a fifth embodiment of a device for partial closing-off according to the invention.

FIG. 18 is a view, in vertical cross-section, of the device shown in FIG. 17, when placed in position by means of appropriate tooling.

FIG. 19 is a partial cross-sectional view through a horizontal plane of the screening of the core of a pressurized water nuclear reactor on which a downflow-upflow conversion has been carried out.

FIG. 20A is a cross-sectional view along line 20—20 of FIG. 19, of the lower part of an obturating device according to the invention and according to a sixth embodiment.

FIG. 20B is a cross-sectional view along line 20—20 of FIG. 19, of the upper part of an obturating device according to the invention and according to the sixth embodiment.

DESCRIPTION OF PREFERRED EMBODIMENTS

Figure 9:
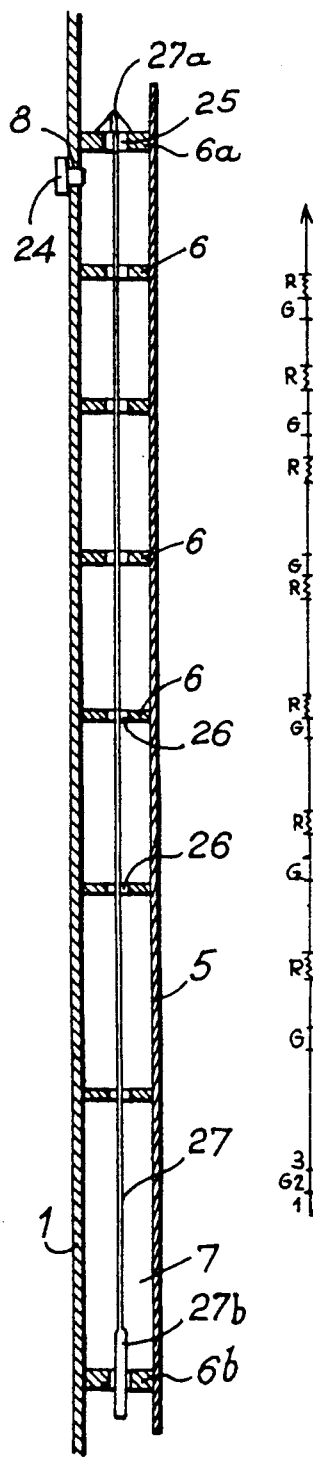
FIG. 9 is a view in cross-section through a vertical plane, of a device for the partial closing-off of the openings of the reinforcement of a partitioning permitting the implementation of the process according to the invention.

FIG. 1 shows the core envelope 1 of a pressurized-water nuclear reactor, within which is disposed partitioning 2 intended to delimit laterally the core of the reactor, the assemblies of which rest on the lower core plate 3.

An upper core plate 4 rests on the upper part of the assemblies. The plates 3 and 4 are pierced in such a manner as to permit the passage of the fluid for cooling the core.

The partitioning 2 consists of planar vertical plates 5 disposed at right angles to one another and delimiting a polygonal contour corresponding to the contour of the core. The partitioning 2 Likewise comprises reinforcement plates 6 disposed along the height of the core, at variable intervals. The plates 6 have a circular external edge corresponding to the internal cross-section of the envelope 1 and an internal edge cut to follow the form of a polygon corresponding to the form of the cross-section of the core. The horizontal reinforcements 6 are disposed along the width of the annular space 7 provided between the external surface of the partitions 5 and the internal surface of the core envelope 1.

The core envelope 1 comprises, in its upper part, below the upper reinforcement 6a, an orifice 8 through which the cooling water enters, when the reactor is in operation.

The cooling water circulates from top to bottom within the annular space 7, and then from bottom to top within the core (arrows 9). In the course of its circulation towards the top in the core, the cooling water traverses the bracing plates 10 of the fuel assemblies of the core, the position of which has been represented in FIG. 1.

FIG. 2 shows the variations, according to the height of the core, of the pressure difference ΔP of the cooling fluid, on either side of the vertical plates 5 of the partitioning. In the left-hand part of FIG. 2, it is possible to see the position of the successive reinforcements 6 of the partitioning, as well as the position of the upper reinforcement 6a along the direction Y corresponding to the height of the core.

The pressure difference ΔP on either side of the vertical plates 5 of the partitioning increases in a manner which is irregular but nevertheless continuous, from the lower part of the core to the upper part. At the lower part of the core, the descending flow of cooling water meets the ascending flow, and the pressure difference ΔP is zero. This pressure difference ΔP is a maximum at the upper part of the core, in the vicinity of the reinforcement 6a.

FIGS. 3 and 4 show two vertical plates 5a, 5b of the partitioning of the core represented in FIG. 1. These plates are represented in cross-section through a horizontal plane and in the vicinity of their junction zone. An interstice 12 exists between the plates 5a and 5b, so that a parasitic jet of cooling fluid 13 (FIG. 3) or 13' (FIG. 4) is directed from the exterior of the partitioning towards the interior of the core, when there is a pressure difference ΔP which is positive on either side of the two faces of the plates 5a and 5b.

As can be seen in FIG. 2, this effect is particularly marked in the upper part of the core.

In the case of FIG. 3, the fuel rods of the assemblies are disposed in such a manner that the jet 13 does not directly strike any fuel rod 14. On the other hand, in the case of FIG. 4, the fuel assemblies are disposed in such a manner that the jet 13' comes to strike directly a fuel rod 14' on an outer row of an assembly.

In both cases, however, the jet 13 or 13' is liable to cause vibration of the rods, which involves an increase in their wear in service.

FIG. 5 shows a partitioning of the core of a pressurized-water nuclear reactor, constructed in accordance with a new design permitting the reduction, or even the elimination, of the parasitic jets traversing the partitioning, to reach the fuel rods.

In this new design, the core envelope 20 does not include any orifice in the upper part, and the horzontal reinforcements 16 of the vertical partitions 15 are all pierced, including the upper reinforcement plate 16a, so that the cooling water of the reactor circulates from bottom to top, both in the annular space 17 included between the partitioning 15 and the internal surface of the core envelope 20, and also in the core of the reactor, within the partitioning 15.

The reinforcements 16 are disposed at the location of the bracing plates of the assemblies of the core and are pierced in such a manner that the loss of head is substantially equal for the cooling water circulating within the annular space 17 and for the cooling water circulating within the core, in the course of the traverse of the reinforcemenets 16 and of the bracing members of the fuel assemblies, respectively.

In this way, the cooling water is under equal pressure conditions on either side of the partitioning 15.

By virtue of this new design of the pressurizedwater nuclear reactors, the appearance of parasitic jets directed towards the interior of the core, through the partitioning, is thus avoided.

However, for nuclear reactors of the old design and which are still in service, the undesirable effect of the parasitic jets traversing the partitioning continues to exist.

A conversion has therefore been envisaged, permitting the modification of the direction of circulation of the cooling water within the annular space between the partitioning and the core envelope. FIGS. 6 and 7 show the principle of this conversion, FIG. 6 showing the structure of the partitioning and the direction of circulation of the cooling water for a reactor in accordance with the old design prior to its conversion, and FIG. 7 showing the structure of the partitioning and the direction of circulation of the cooling water in the same reactor, after an intervention permitting the performance of the conversion of the reactor in order to obtain a circulation of the cooling water from bottom to top, within the annular space at the periphery of the partitioning.

The elements which correspond in FIG. 1 and in FIGS. 6 and 7, respectively, bear references numerals.

The configuration represented in FIG. 6 substantially corresponds to the configuration of FIG. 1, the core envelope 1 comprising an orifice 8 in its upper part and the upper reinforcement 6a of the partitioning not comprising any holes for the passage of water.

Furthermore, a thermal screen 19 is placed around the core envelope 1 and constitutes, together with the latter, an annular space into which penetrates a part of the flow of the cooling water in circulation within the vessel (arrows 21). This flow of cooling water 21 penetrates into the annular space 7 included between the vertical plates of partitioning 5 and the internal surface of the core envelope 1, through the orifice 8. The flow of cooling water 21 then circulates in the vertical direction and from top to bottom within the annular space 7 while traversing the reinforcements 6 through the orifices provided in these reinforcements. Finally, the flow of cooling water 21 is mixed with the principal flow 22 of cooling water at the base of the partitioning, in order to circulate then in the vertical direction and from bottom to top within the core.

This type of circulation of the cooling water from top to bottom at the periphery of the partitioning is generally designated by the term "downflow". Downflow circulation, as explained previously with reference to FIG. 2, involves a pressure difference on either side of the partitioning and the appearance of jets of partitioning 23 which are particularly intense in the upper part of the core.

An intervention was therefore provided for on the nuclear reactor, which permits a change from a downflow circulation to "upflow" circulation, i.e. circulation in the vertical direction and directed towards the top, around the partitioning, as represented in FIG. 7.

In order to achieve this result, the closing of the orifice 8 of the core envelope 1 is effected by a plug 24 and the upper reinforcement 6a is pierced in alignment with the holes traversing the other reinforcements 6.

In order to carry out the insertion of the plug 24, a passage hole 24' is produced by piercing through the thermal screen 19.

In the upflow type of circulation of the cooling water, this type of circulation being likewise that which is implemented in the case of the new design represented in FIG. 5, the principal flow 22' of cooling water passing outside the core envelope traverses the lower core plate 3, is distributed within the core and within the annular space 7 and circulates in parallel from bottom to top, within the core and within the annular space 7.

FIG. 8 shows the pressure difference ΔP of the cooling fluid on either side of the partitioning, in the case of downflow circulation as represented in FIG. 6 (curve in full lines) and in the case of the flow circulation as represented in FIG. 7 (curve in broken lines). The curve in full lines of FIG. 8 which substantially corresponds to the curve of FIG. 2, shows that the pressure difference ΔP on either side of the partitioning increases from a zero value at the base of the partitioning to a maximum value at the upper part of the partitioning.

In the case of an upflow circulation of the cooling water, the losses of head of the fluid circulating within the annular space at the periphery of the partitioning, in the course of the traverse of the openings provided in the reinforcements, are of the same order as the losses of head which are suffered by the fluid circulating within the core, in the course of the traverse of the bracing plates of the assemblies. However, in contrast to the structure according to the new design represented in FIG. 5, the reinforcements 6 are not placed systematically at the location of the bracing plates of the assemblies of the core. As a result, as shown in FIG. 8, there are certain zones where the pressure of the cooling water is greater within the annular space outside the partitioning than within the partitioning at the same height. These zones are located principally within the lower part of the core.

When the play between the partitions is small, the parasitic jets generated by this pressure difference and directed towards the interior of the core have a low intensity, far below permissible.

However, when the play between the partitions has a higher value, the parasitic jets directed towards the interior of the core may have an intensity such that the rods are set into vibration.

FIG. 9 shows a device permitting the implementation of the process according to the invention, in such a manner as to limit the intensity of the parasitic jets to a very low value, along the entire height of the core.

The process according to the invention is implemented on the partitioning of the core of a nuclear reactor which has undergone an intervention such as that represented in FIG. 7 in order to change from a flow circulation to an upflow circulation of the cooling water.

The corresponding elements in FIGS. 7 and 9 bear the same reference numerals.

The intervention on the partitioning consisted in piercing the upper reinforcement 6a to form passage orifices 25 therein, each located in alignment with a line of orifices 26 traversing the reinforcements 6 located below the reinforcement 6a, and in placing a closing plug 24 in the orifice 8 situated at the upper part of the core envelope 1.

The process according to the invention consists in increasing the loss of head of the cooling fluid when passing through the orifices 26 of the reinforcements 6 by partial closing-off of these orifices 26. This closing-off is achieved by the top of the partitioning, by introducing the closing-off devices through the orifices 25 of the upper reinforcement 6a.

In the case of the embodiment represented in FIG. 9, use is made of devices for partial closing-off which consist of the running part of a rod 27 exhibiting an upper supporting part 27a on the upper support 6a and a lower widened part 27b ensuring the guiding and the ballasting of the rod during its introduction into the partitioning.

The upper supporting part 27a of the rod comprises two wings at 90°, the length of which is greater than the diameter of the orifice 25.

The process according to the invention is implemented during a shutdown of whose nuclear reactor, the vessel is open and filled with water. The rods 27 are made available and placed in position in the lines of orifices of the partitioning, from the edge of the well of the reactor.

When the reactor is placed in operation once again, the rods 27 remain in position in the partitioning, where they are retained in position under the action of their own weight or of a retaining device.

Figure 10:
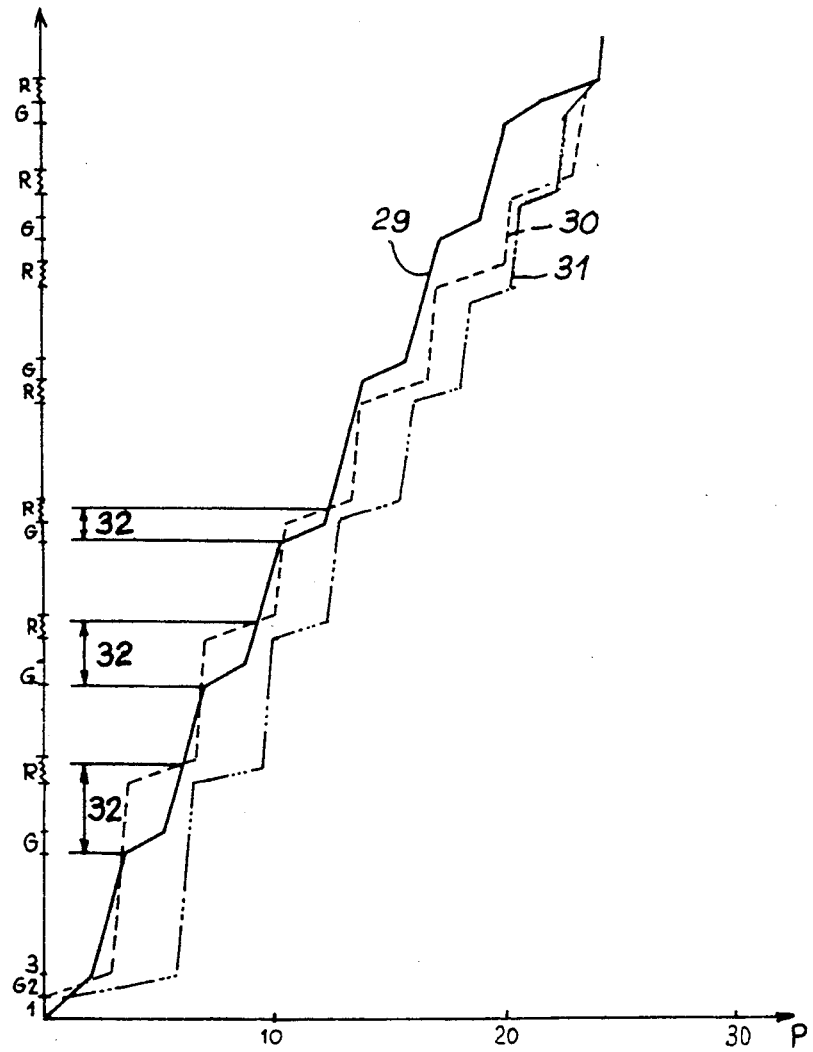
FIG. 10 represents curves of variation of the pressure in dependence upon the height of the core of a nuclear reactor, on either side of the partitioning, after a conversion operation such as that represented in FIGS. 6 and 7.

FIG. 10 shows the development of the loss of head of the cooling water of the reactor, depending upon the height of the core, within the partitioning, i.e. within the core itself (curve 29 in full lines) and within the annular space at the periphery of the partitioning, in the case of an upflow conversion without utilization of the process according to the invention (curve 30 in broken line), and in the case of an up flow conversion with utilization of the process according to the invention for partial closing-off of the orifices of the reinforcements (curve 31 in mixed lines).

The zones occupied by the reinforcements (zones R) and the zones occupied by the grids (zones G) have also been represented, along the axis of the ordinates.

It will be noted that the zones occupied by the reinforcements and the zones occupied by the grids are not superposed, and that the curve 30 passes above the curve 29 in certain zones 32 located principally at the lower part of the core. In these zones, the pressure of the cooling water is greater within the annular space than within the core, so that parasitic jets directed towards the interior of the core are liable to be formed.

On the other hand, the curve 31 is below the curve 29, the partial closing-off of the orifices 26 of the reinforcements 6 involving an increase in the loss of head in the cooling fluid in circulation within the annular space, principally at the location of the orifices 26 of the lower reinforcement 6b, in which orifices the widened parts 27b of the rods 27 are engaged.

It can be seen that the process according to the invention permits the avoidance of the formation of parasitic jets, principally in the lower part of the core, by differently distributing the loss of head of the cooling fluid circulating within the annular space at the periphery of the partitioning.

It is clearly evident that it is possible to introduce into the orifices 26 of the reinforcements 6 disposed along a vertical row a rod of variable cross-section permitting the reduction, to a greater or lesser extent, of the passage cross-section of the orifices 26, as a function of the position of the corresponding reinforcement 6 in dependence upon the height of the core. It is likewise possible to provide a reduction of cross-section only on certain ones of the orifices of the reinforcements 6.

The process according to the invention therefore has great flexibility and permits the best adaptation of the passage cross-sections of the orifices of the reinforcements and thus of the losses of head within the annular space at the periphery of the partitioning, to the passage cross-section and to the position of the bracing grids within the core determining the losses of head of the cooling water circulating within the partitioning.

FIGS. 11 and 12 show a second embodiment of a device for the partial closing-off of an orifice 26 of a reinforcement 6 of the partitioning of a nuclear reactor which has undergone an upflow conversion.

The device for reducing the cross-section consists of a hollow rod 35 provided with centering fins 36 placed at 90° to one another and forming a plurality of successive sets along the length of the rod.

The successive sets of fins 36 are disposed in such a manner as to come to be placed at the location of the reinforcements 6, within the orifices 26, when the rod 35 is placed in position within the partitioning, in the same way as the rod 27 represented in FIG. 9. The fins 36 have radial dimension such that there is a very little play between their ends and the edges of the orifice 26, after rod 35 is placed in position.

A maneuvering rod 37 is disposed within the hollow rod 35 and includes diametrally widened portions 38 intended to cooperate with profiled and narrowed portions 35a of the internal bore of the rod 35 situated at the location of the sets of fins 36, in order to achieve the diametral expansion of the rod 35 and of the fins 36 within the orifice 26. In this way, rod 35 is irreversibly fixed within the orifices 26 of the reinforcements 6.

In the case of the third embodiment represented in FIG. 13, the hollow rod 35' carries centering and fixing fingers 36' which are articulated on the rod 35' at the location of windows passing through its lateral wall, the finger assemblies for centering the rod 35' being disposed in such a manner as to come within the orifices 26 of the reinforcements 6 when the rod 35' is placed in position within the partitioning. The rod 35' comprises, along its axis, a maneuvering rod 37' including a widening 38' capable of actuating the fingers 36'. The maneuvering rod 37' is moveable axially within the hollow rod 35' in order to achieve the separation of the centering and fixing fingers 36' after the rod 35' has been placed in position within the partitioning.

The devices represented in FIGS. 11, 12 and 13 have the advantage of ensuring effective centering and retention of the devices for partial closing-off of the orifices, within the partitioning.

FIGS. 14 and 15 show a fourth embodiment of a device for the partial closing-off of the orifices 26 of the reinforcements 6 of a partitioning. The device includes a centering element with fins 40 and a rod 41 similar to the rod 27 represented in FIG. 9.

The centering elements with fins 40 include a lower part engaged in the orifice 26 virtually without play and an upper part of greater diameter which comes to rest on the reinforcement 6.

The centering elements 40 permit the transverse retention of the rod 41 to be ensured.

FIG. 16 shows lower part of a rod 43, similar to the rod 27 represented in FIG. 9. The rod 43 includes a lower supporting part 44 diametrally enlarged and including a conical part capable of engaging in a cavity 45 machined in the lower core plate 3, in alignment with the orifices 26 of the reinforcements 6 of the partitioning 5.

The widened portion 44 of the rod 43 comes to be positioned within the orifice 26 of the lower reinforcement 6b of the partitioning. The rod 43 may also include at least one other diametrally widened portion 47 coming into engagement in the orifice 26 of a reinforcement 6b.

FIG. 17 shows a a device for the partial closing-off of an orifice 26 passing through a reinforcement 6 consisting of a bushing 48, the end portions 48a and 48b of which may be turned down towards the outside in order to achieve a clamping of the bushing 48 within the orifice 26 of the reinforcement 6.

FIG. 18 shows a tooling 50 permitting the implementation of the clamping of the bushing 48 within the orifice 26 of the reinforcement 6. The tooling 50 comprises a central rod 51, to the end of which is fixed a lower clamping ring 52 and a sliding sleeve 53, the end of which constitutes an upper clamping ring. The clamping of the bushing 48 in the orifice 26 is obtained by traction of the rod 51 towards the top and by pushing the sliding sleeve 53 towards the bottom.

In all cases, the process according to the invention may be implemented at any time after the downflow upflow conversion of the nuclear reactor. This process may be implemented, during a refuelling of the reactor, after a certain time of operation of this reactor in upflow circulation without the utilization of the process of the invention.

The process and the devices according to the invention permit a great limitation of the intensity of the parasitic jets which may persist after an upflow conversion without this process, or possibly the elimination of these parasitic jets over the entire height of the core.

The obturating device according to the sixth embodiment (FIG. 20A and 20B) is applied to a pressurized water nuclear reactor, the downflow-upflow conversion of which has been performed, as represented in FIGS. 6 and 7.

This conversion operation is performed by undertaking the plugging of the core casing in its upper part and the piercing of the upper reinforcement designated by the reference 6a.

The successive reinforcements of the screening which are disposed along the height of the core are pierced by openings aligned in the vertical direction, into which openings there are introduced obturating rods as represented in FIG. 9.

FIG. 19 is a partial cross-sectional view of the screening of a pressurized water nuclear reactor, above a reinforcement of this intermediate screening between the lower reinforcement and the upper reinforcement.

The screening of the core includes the cylindrical core casing 61, the screening per se 62, the section of which corresponds to the section of the core of the reactor, consisting of fuel assemblies of square section and the reinforcements such as 63 which are fixed by their outer part on the core casing 61 and cut out at their inner part in such a manner as to espouse the outer shape of the screening 62.

The screening per se 62 consists of plates 64 assembled at right angles, in such a manner as to abut on the peripheral surface of the core of the reactor consisting of juxtaposed fuel assemblies. The plates 64 are disposed over the entire height of the core corresponding to the height of a fuel assembly and are juxtaposed along junction surfaces 65, along which there may be subsistent interstices permitting the passage of the cooling fluid between the outside and the inside of the core, in the case where a pressure difference exists on both sides of the screening 62.

The reinforcements 63 are pierced by openings for the passage of water 66, the arrangement of which is determined in a precise manner in relation to the screening 62. The openings 66, depending upon their position in relation to the screening, are of two main types, openings 66b having a greater diameter openings 66a.

The obturating devices according to the invention consist of rods engaged into the openings 66a and 66b machined in the successive reinforcements along the height of the core and aligned in vertical directions, as can be seen in FIGS. 20A and 20B.

The obturating devices engaged into the openings 66a and the obturating devices engaged into the openings 66b are distinguished only by the diameter of the rod and the radial dimensions of the retaining fins disposed in the openings 66a and 66b, at the location of the reinforcements 63.

As can be seen in FIGS. 20A and 20B the screening of the core comprises, from the lower plate of the core 70, on which plate rest the fuel assemblies, eight successive horizontal reinforcements 63a, 63b, 63c, 63d, 63e, 63f, 63g and 63h disposed successively along the height of the core, with specified spacings in the vertical direction. These reinforcements all have an identical cross-section, a part of which is represented in FIG. 19.

The reinforcement 63a constitutes the lower reinforcement and the reinforcement 63h the upper reinforcement of the screening.

The obturating device designated generally by the reference 68 represented in FIGS. 20A and 20B, comprises a rod 71 and sets of fins 72 fixed on the rod 71 in positions corresponding to the positions of the successive reinforcements 63a to 63g. The lower part of rod 71 rests, on the lower core plate 70, below the lower reinforcement 63a.

The lower part 71a of the rod 71 engaged into the lower reinforcement 63a, has a diameter which is substantially greater than the diameter of the upper part 71c of the rod engaged within the reinforcements 63b to 63g. Between the parts 71a and 71c of the rod, there is provided a frusto-conical connecting part 71b located slightly below the second reinforcement 63b. This difference in diameter permits the imparting of a constant rigidity to the rod, in spite of the greater spacing of the lower reinforcements.

This leads to the obtaining of a large loss of head at the lower part of the screening which corresponds to the zone where the pressure difference of the cooling water between the outer part and the inner part of the screening is greatest.

The obturating devices introduced into the openings 66a, as well as the obturating devices introduced into the openings 66b, have this particular feature.

In the case of openings 66a, the diameter of which is slightly greater than 28.5 mm, and of openings 66b, the diameter of which is slightly less than 35 mm, the part 71a of the rod, both in the case of the device for obturating the openings 66a and the openings 66b, has a diameter of 22 mm in a preferred embodiment of the invention.

On the other hand, the smaller diameter upper part 71c of the rod has a diameter of 12 mm in the case of the openings 66a and a diameter of 14 mm in the case of the openings 66b.

Figure 21:
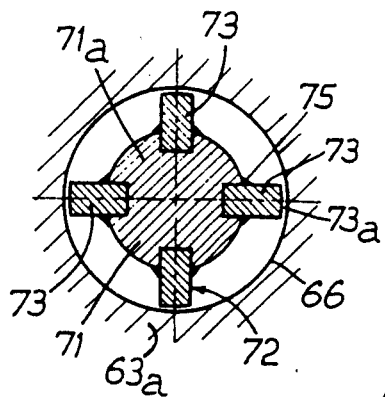
FIGS. 21, 22 and 23 are cross-sectional views along lines 21—1, 22—22, 24—24, respectively, of FIGS. 20A and 20B.

As can be seen in FIG. 21, the set of fins 72 disposed within an opening 66 of the lower reinforcement 63a consists of four fins 73 placed in positions at 90° to one another at the periphery of the solid rod 71 in the large diameter lower part 71a of the rod. The fins 73 are disposed radially in relation to the rod 71 and are fixed by welds 75 on the peripheral surface of the rod. The outer edge 73a of each one of the fins 73 coming in to contact with the internal surface of the opening 66 in order to perform the retention of the rod 71 is located at a distance from the axis of the rod 71 which is equal to the radius of the opening 66. In this manner, the fins 73 ensure perfect centering of the rod 71 within the opening 66.

The fins 73 and the rod may be of monoblock construction, the fins being obtained by machining a solid bar.

The fins 73 of the devices for obturating the openings 66a project radially from the peripheral surface of the rod 71 over a distance which is smaller than the fins 73 of the devices for obturating the openings 66b.

Figure 22:
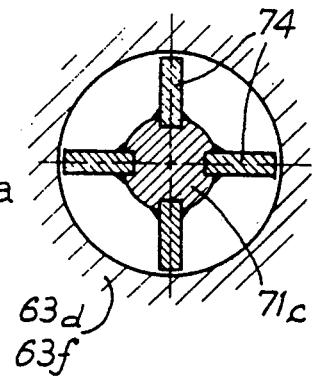

FIG. 22 shows a set of fins 74 for retaining a rod 71 of an obturating device 68, at the location of the fourth reinforcement 63d or of the sixth reinforcement 63f. This set of fins is constituted in the same manner as the set of fins which is disposed at the location of the first reinforcement 63a represented in FIG. 21. However, the fins 74 have a radial extension greater than the radial extension of the fins 73, the rod 71 having its small-diameter part 71c engaged within the reinforcements 63d and 63f.

The fins 74 fixed at the periphery of the part 71c of the rod ensure a perfect centering of the rod 71 within the corresponding reinforcements.

Figure 23:
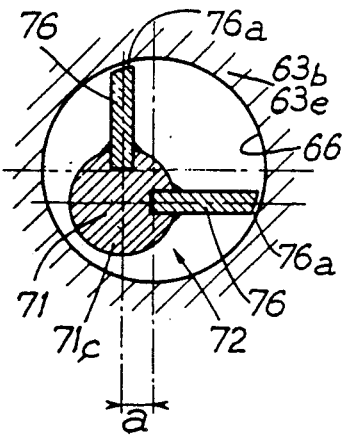

FIG. 23 shows a set of fins 72 disposed at the location of an opening 66 of one of the reinforcements 63b, 63c, 63e or 63g. The set of fins 72 comprises two fins 76 fixed at 90° to one another on the peripheral surface of the small-diameter part 71c of the rod 71.

The fins 76 project radially in relation to the peripheral surface of the rod 71, over a same distance. The edges 76a of these fins 76 abutting on the internal surface of the opening 66 to ensure the retention of the rod 71 are at a distance from the axis of the rod 71 greater by a length a than the radius of the opening 66.

In the course of the setting up thereof in the corresponding opening, the rod 71 is placed in such a manner that its axis is offset by a length a in relation to two perpendicular axes passing through the center of the opening 66. The axis of the rod 71 is therefore offset in a radial direction making an angle of 45° with the axes passing through the center of the opening 66.

The supporting edges 76a of the fins 76 are slightly rounded and inclined in such a manner as to correspond perfectly to the form of the internal contour of the opening 66.

The fins 76 situated at the location of the reinforcement 63b and at the location of the reinforcement 63e are placed, at the periphery of the rod 71, in similar positions. The fins 76 placed at the location of the reinforcement 63c or at the location of the reinforcement 63g are likewise placed, at the periphery of the rod 71, in similar positions, but diametrically opposed in relation to the positions of the fins 76 at the location of the reinforcements 63b and 63e.

The result of this is that the rod 71 is offset in a radial direction at 45° in relation to the axes passing through the center of the opening 66 and parallel to the fins 76, in one direction at the location of the reinforcements 63b and 63e and in the opposite direction at the location of the reinforcements 63c and 63g.

These alternate offsets of the axis of the rod 71 in radial directions produce a camber of the rod at the moment of the setting up thereof ensuring a retention of this rod in relation to the screening due to the resilient restoring force of the rod towards its initial form. This retention is obtained with a simple device not including any movable fastening piece. It resists the raising of the rod and the development of vibrations induced by the flow of the water.

Figure 24:
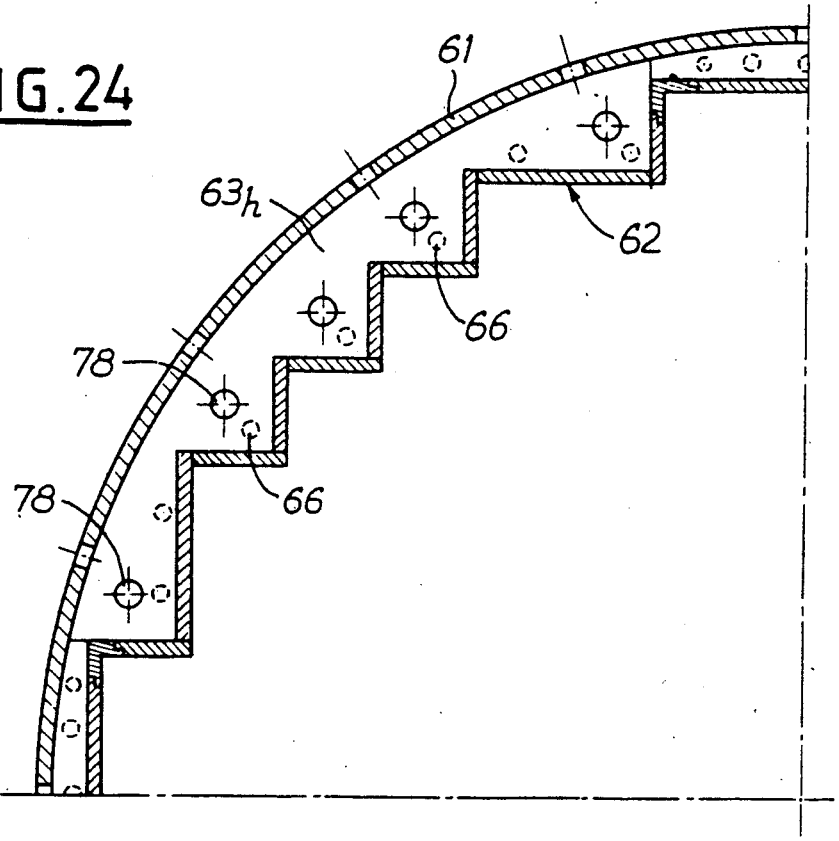
FIG. 24 is a partial cross-sectional view of the screening of FIG. 19 through a horizontal plane, above the upper reinforcement.

FIG. 24 shows the upper part of the screening at the location of the upper reinforcement 63h.

In order to undertake the downflow-upflow conversion, the reinforcement 63h is pierced with openings 78 placed in specified positions in relation to the screening.

As can be seen in FIG. 20B, these openings 78 may be very close to the openings 66 permitting the introduction of the obturating devices 68 into the screening. These devices may possibly include a fixing means 79 at their upper part which is accommodated in the opening 66 of the upper reinforcement of the reinforcement 63h.

Figure 25A:
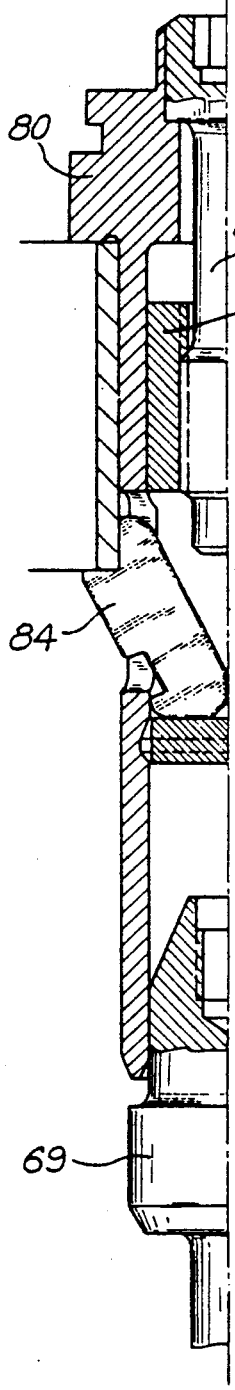
FIGS. 25A and 25B are half-views in cross-section through a vertical plane of symmetry of a plug for fixing an obturating rod according to the sixth embodiment at the location of the upper reinforcement of the screening, in the locked position and in the unlocked position, respectively.
Figure 25B:
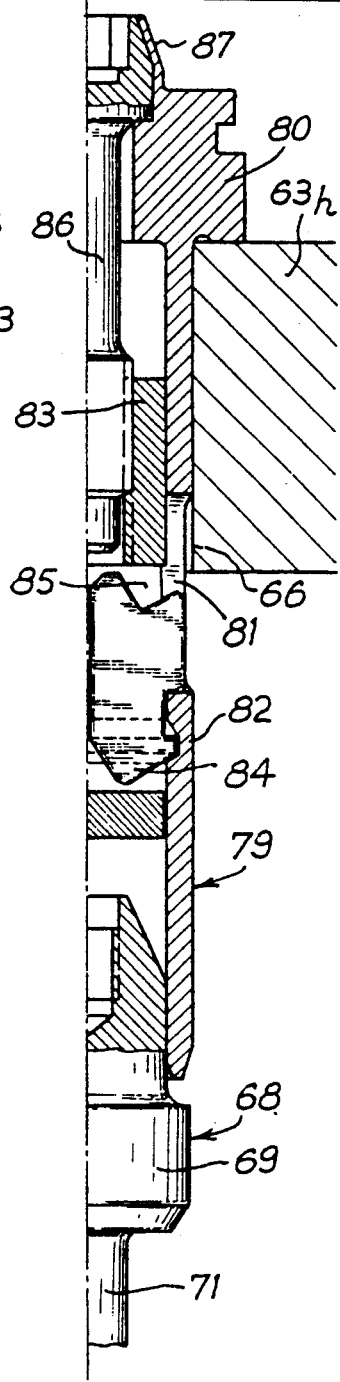

FIGS. 25A and 25B show a fixing means 79 of an obturating device 68 on the upper reinforcement 63h consisting of a plug having a structure which is fairly similar to that of the plug which may serve to obturate the upper part of the core casing, in the downflow-upflow conversion of a nuclear reactor.

The plug 79 includes a body 80, the large diameter upper part of which rests on the upper reinforcement 63h, at the location of an opening 66 and the smaller-diameter lower part of which, of tubular form, is introduced into the opening 66. The tubular part of the body 80 includes windows 81 and a throat 82 on its inner surface.

Within the tubular part of the body 80, there is slidingly mounted a sleeve 83 including passages 85 in each one of which a pivoting finger 84 is mounted.

The sliding sleeve 83 may be displaced in the axial direction by a screw 86, the head of which is accessible above the upper reinforcement 63h of the screening.

FIG. 25A shows the sliding bush 83 in its top position, the fingers 84 cooperating by their lower end part with the internal surface of the tubular part of the body 80 then being engaged on the lower surface of the reinforcement 63h, by their upper end part.

FIG. 25B shows the sliding bush 83 in its bottom position, the pivoting fingers 84 cooperating by their end part with the base of the throat 82 then being in a position retracted within the passages 81. In this retracted position, the obturating device 68 is not fixed in relation to the upper reinforcement 63h and may be extracted from the screening by traction on its upper end.

The screw 86 may be locked against rotation by a deformable part 87 of the body 80 which is turned down into an internal recess provided in the head of the screw 86.

The fixing means 79 may therefore pass from its locked position, represented in FIG. 25A, to its unlocked position, represented in FIG. 25B, and conversely by displacement of the sliding bush 83 in one direction or in the other by screwing or unscrewing of the screw 86.

The head of the obturator 69, which head is constituted by a broadening of the obturating rod 71, is engaged into the lower end of the tubular part of the body 80, in such a manner that the fixing means 79 ensures the retention of the obturating device 68 while permitting axial displacements of the rod 71 in relation to the body 80, under effect of the thermal expansions.

Figure 26:
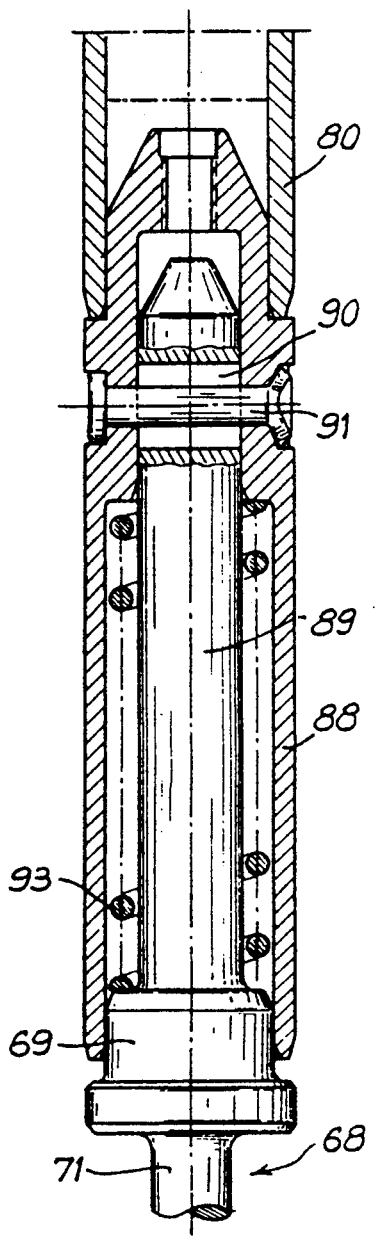
FIG. 26 is a view in cross-section through a vertical plane of symmetry of a device for retaining the upper part of an obturating rod according to the invention.

FIG. 26 shows an embodiment of the linkage between the rod 71 of the obturating device 68 and the lower part of the body 80 of a fixing means, such as the means 79 represented in FIGS. 25A and 25B.

A bush 88 is engaged by its upper part into the lower end of the tubular body 80 and receives in its inner part an extension 89 of the head 69 of the obturating device 68. The extension 89 of the head 69 is pierce with a through passage 90 in which there is engaged a pin 91 riveted on the bush 88. A helical spring 93 is intercalated between the base of the bush 88 and the head 69 of the obturating device 68. The passage 90 permits axial displacement of the body 89 and of the rod 71 of the obturating device 68 in relation to the bush 88; this permits the absorption of the thermal expansions of the obturating rod 71 during the operation of the reactor. The helical spring 93 permits a restoration of the obturating rod 71 in a downward direction.

The obturating devices consisting of the rods 71 and the sets of fins 72 may advantageously be made of a nitrogen-containing austenitic stainless steel, for example of the type Z2CN1910, or alternatively of a bolting steel of the cold-hammered type Z2CND1712, used to make components for bolting the internal equipment of pressurized-water nuclear reactors.

With the devices according to the invention, it is possible to undertake a partial obturation of the openings of the reinforcement of the screening, this obturation representing a reduction of the openings of the reinforcements which is within the range between 18 and 34%, it being possible for the values to be different at each location.

It would, of course, be possible to undertake a more complete obturation of the openings, to the extent necessary.

The average speeds of circulation of the cooling water in the reduced sections of the openings of the reinforcements are the following: 8 m/s in the lower reinforcement, 5.5 m/s in the intermediate reinforcements and 2.5 m/s in the upper reinforcement.

Figures 27, 28:
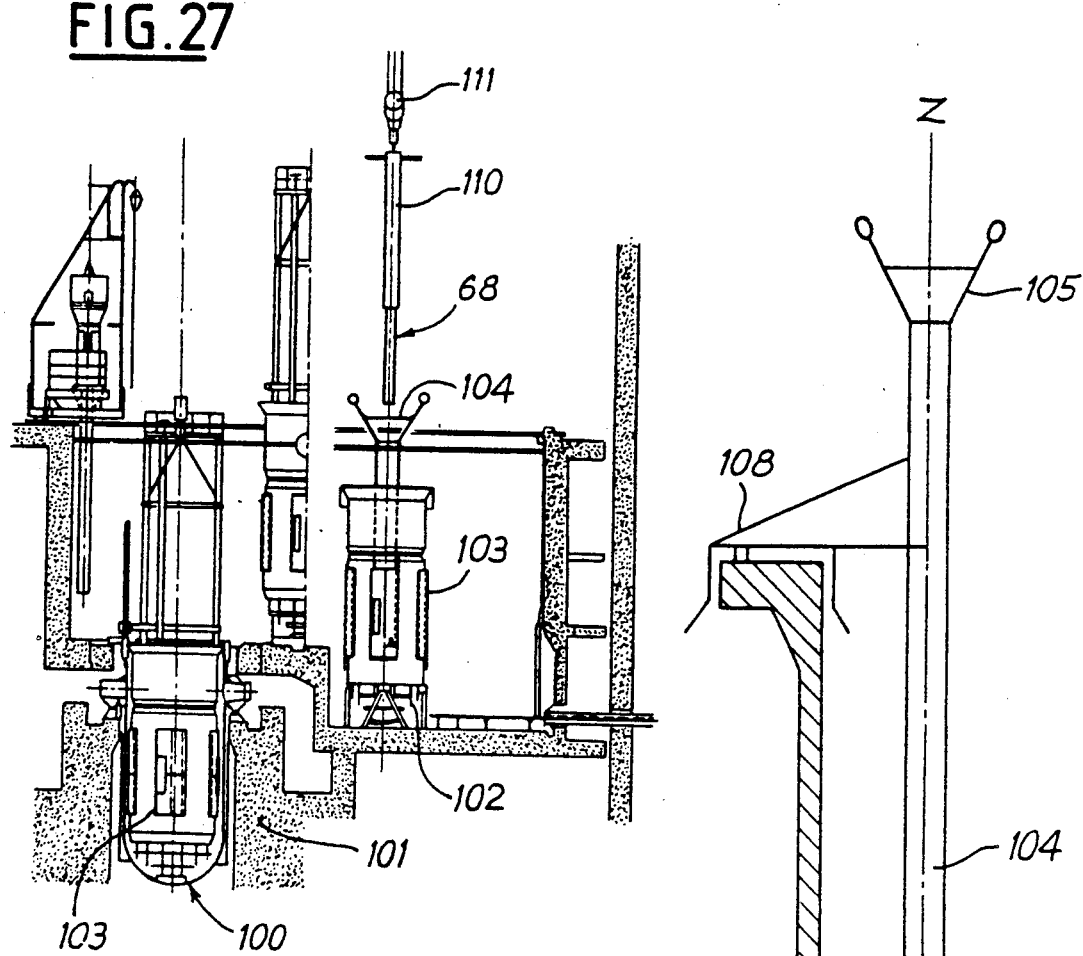
FIG. 27 is a general view of a pressurized water nuclear reactor, in the screening of which the setting up of obturating rods is performed by a process according to the invention.
FIG. 28 is a view, on a larger scale, showing a guide tube permitting the implementation of the obturating process according to the invention.

FIG. 27 shows the chamber 100 of a nuclear reactor, which chamber is disposed within the structure 101 of the reactor building which includes, in an adjacent arrangement in relation to the chamber 100, a support 102 for the lower internal equipment 103 of the nuclear reactor.

In order to undertake the setting-up of obturating devices according to the invention within the screening of the core, the lower internal equipment 103 including the screening is removed from the chamber and set up on the support 102.

A guide tube 104 is set up within the lower internal equipment 103 in order to undertake the introduction of a first obturating device.

As can be seen in FIG. 28, the guide tube 104 which includes a flared upper end 105 is set up in the lower internal equipment 103 including the core casing 61 and the screening 62, in such a manner that its axis ZZ' is aligned with the vertical alignment direction of a series of openings 66 of the reinforcements 63. The lower part 106 of the guide tube 104 comes to rest on the upper reinforcement 63h, around an opening 66 of this reinforcement 63h. Retaining devices 107 and 108 permit the fixing of the guide tube 104 on the screening 62 and on the upper part of the core casing 61 of the lower internal equipment 103, respectively.

An obturator 68 is fixed at the end of a retaining rod 110, which is itself connected to the retaining hook 111 of a crane of the reactor building.

The obturating device 68 including a rod 71 and sets of retaining fins 72 is introduced into the guide tube 104, in which the obturating device 68 and the retaining rod 110 are caused to descend. The obturating device 68 is introduced into the opening 66 of the upper reinforcement 63h and then into the openings of the successive reinforcements, which openings are aligned with the opening 66, by thrust on the retaining rod 110.

At the location of certain reinforcements, the offset position of the retaining fins permits the implementation of an offset of the axis of the rod 71, permitting a retention of this rod by camber, within the screening of the core.

When the lower part of the rod 71 comes into abutment on the lower core plate, the retaining rod 110 is separated from the obturating device 108 and extracted from the guide tube 104.

The guide tube 104 is displaced towards a new position in the alignment of a series of openings of the reinforcements of the screening of the core.

The fixing means 79 of the obturating device 68 is locked within the opening 66 of the upper reinforcement 63h.

It is then possible to undertake the setting-up of a new obturating device, in the manner which has been described hereinabove.

The obturating device according to the invention may therefore be set up and fixed in the screening of the core of a nuclear reactor by simple thrust within a series of aligned openings of the reinforcements of the screening.

Likewise, the demounting of an obturating device may be undertaken by traction on the upper end of the rod of this obturating device, at the location of the upper reinforcement.

Moreover, this device is of a simple structure and does not include any moving part.

Thus, it is possible to use the devices for the partial closing-off of the openings of the reinforcements of a type different from those which have been described.

It is possible to effect the partial closing-off of the passage openings of certain reinforcements exclusively and, in particular, of the reinforcements located towards the lower part of the core. Advantageously, it is possible to close off exclusively the passage holes of the lower reinforcement.

In the case where the openings of the reinforcements are not aligned along vertical directions, or in the case where the openings of the lower reinforcements are not aligned with the openings of the upper reinforcement, it is possible to use curved toolings in order to place the devices for partial closing-off in position.

In the case of a cambered rod according to the sixth embodiment, it is possible to envisage sets of fins having a shape and an arrangement which are different from those which have been described.

Likewise, the means for fixing the obturating devices on the upper reinforcement may have a different shape.

The setting-up of the obturating devices in the lower internal equipment of the reactor may be carried out in a different manner.

Finally, the invention is applicable in all cases where a downflow-upflow conversion of a nuclear reactor has been carried out by piercing the upper reinforcement of its screening and by plugging of the core casing.

The process and the devices according to the invention are applicable in the case of any nuclear reactor, the partitioning of which has been modified in order to change from a downflow circulation to an up flow circulation of the cooling water.

We claim:

1. Process for limiting the intensity of parasitic jets of cooling water in a pressurized-water nuclear reactor in service, the reactor comprising a core consisting of juxtaposed fuel assemblies and surrounded at its periphery by a baffle assembly comprising vertical plates, between which plates there are interstices constituting passages for the parasitic jets of water through the baffle assembly towards the interior of the core, and horizontal reinforcement plates disposed at different levels between the vertical plates and a cylindrical core envelope having a vertical axis, surrounding the baffle assembly and forming an annular space around the vertical plates, in which space are placed the reinforcements which are pierced in such a manner that the cooling water circulates from bottom to top, both in the core and within the annular space of the baffle assembly, the process comprising introducing, during a shut-down of the reactor, devices for the partial closing off of at least a part of the openings of the reinforcements, into at least a part of the openings, and including the steps of
    (a) extracting lower internal equipments including the baffle assembly from the vessel of the reactor;
    (b) disposing the lower internal equipments on a support, within the building of the reactor, and successively, for each device for closing off the openings of the reinforcements;
    (c) disposing a guide tube within the internal equipments in the axial alignment of a set of aligned openings of the reinforcements of the baffle assembly;
    (d) introducing a closing off device including a rod within the guide tube;
    (e) guiding the closing off device in such a manner as to introduce it into the opening of the upper reinforcement of the baffle assembly and then into the openings of the other reinforcements of the baffle assembly, by simple thrust on the rod, and restarting the nuclear reactor.

2. Process according to claim 1, wherein each of the closing off devices includes sets of fins disposed in sites corresponding to the sites of the reinforcements along the length of the rod and the fixing of the closing off device within the baffle assembly is ensured by transverse offset of at least two sets of fins, along the length of the rod.

* * * * *